United States Patent [19]

Swan et al.

[11] Patent Number: 4,965,123

[45] Date of Patent: Oct. 23, 1990

[54] OPAQUE ORIENTED POLYMERIC FILM STRUCTURE AND METHOD OF PREPARING SAME

[75] Inventors: Larry G. Swan, Fairport; Ronald C. Wood, Jr., Pittsford, both of N.Y.

[73] Assignee: Mobil Oil Corporation, Fairfax, Va.

[21] Appl. No.: 458,874

[22] Filed: Dec. 29, 1989

[51] Int. Cl.$^5$ .................. B32B 3/26; B32B 7/02; B32B 31/16

[52] U.S. Cl. ...................... 428/314.4; 156/229; 264/210.7; 428/315.5; 428/315.9; 428/316.6; 428/317.9; 428/516; 428/910

[58] Field of Search ............ 428/314.4, 315.5, 315.9, 428/316.6, 317.9, 516, 910; 264/210.7; 156/229

[56] References Cited

U.S. PATENT DOCUMENTS

| | | | |
|---|---|---|---|
| 3,697,367 | 1/1972 | Schwarz | 428/398 |
| 4,118,438 | 10/1978 | Matsui et al. | 428/338 |
| 4,377,616 | 3/1983 | Ashcraft et al. | 428/315.7 |
| 4,560,614 | 12/1985 | Park | 428/317.9 |
| 4,582,736 | 4/1986 | Duncan | 428/317.9 |
| 4,701,370 | 10/1987 | Park | 428/314.4 |
| 4,758,396 | 7/1988 | Crass et al. | 264/145 |

*Primary Examiner*—William J. Van Balen
*Attorney, Agent, or Firm*—A. J. McKillop; C. J. Speciale; M. J. Mlotkowski

[57] ABSTRACT

An opaque, biaxially oriented polymeric film structure. The film structure comprises: a thermoplastic polymer matrix core layer having a first surface and a second surface, within which is located a strata of voids; positioned at least substantially within a substantial number of the voids is at least one spherical void-initiating particle which is phase distinct and incompatible with the matrix material, the void space occupied by the particle being substantially less than the volume of the void, with one generally cross-sectional dimension of the particle, at least approximating a corresponding cross-sectional dimension of the void; the population of the voids in the core being such as to cause a significant degree of opacity; and at least one thermoplastic polymer matrix skin layer adhering to at least the first surface of the core layer, within which is located a strata of voids; positioned within at least a substantial number of the voids is at least one inorganic void-initiating solid particle which is phase distinct and incompatible with the matrix material, the void space occupied by the particle being substantially less than the volume of the void, with one generally cross-sectional dimension of the particle, at least approximating a corresponding cross-sectional dimension of the void.

20 Claims, No Drawings

OPAQUE ORIENTED POLYMERIC FILM STRUCTURE AND METHOD OF PREPARING SAME

FIELD OF THE INVENTION

This invention relates to the field of polymer films of enhanced opacity and to a method of making such films. More particularly, the invention relates to a biaxially oriented composite film structure having improved properties.

BACKGROUND OF THE INVENTION

It is known in the art that thermoplastic polymers can be loaded with inert fillers, cast into films, and thereafter stretched to form oriented thermoplastic films. While this statement is generally true, it must be realized that the particular components employed and the specific process parameters employed, particularly when control is difficult, can result in significantly different end products or contribute to the success or failure of obtaining a desired result. As an example, U.S. Pat. No. 4,118,438, discloses the use of some materials similar to those contemplated by the present invention, however, the object of U.S. Pat. No. 4,118,438 is diametrically opposed to the object of the present invention. U.S. Pat. No. 4,118,438 is concerned with a transparent polypropylene film containing fine particles of an incompatible polymer dispersed therein. The film disclosed exhibits surface projections caused by the dispersed particles and the patentees maintain that this gives the transparent film non-blocking characteristics. In U.S. Pat. Nos. 3,697,367 and 3,795,720, there is disclosed a process for preparing an uniaxially oriented mixed polymer system. The resulting material has utility as a paper substitute and can be formed into fibers for making sheet paper.

U.S. Pat. No. 4,377,616, the contents of which are incorporated by reference in their entirety, discloses an opaque biaxially oriented polymer film structure comprising a thermoplastic polymer matrix film core layer possessing numerous voids, a substantial number of which contain at least one spherical void-initiating particle, and transparent, void-free thermoplastic skin layers adhering to the surface of the core layer. The unique structure of the core layer imparts a much higher degree of opacity, possibly due to the effects of light scattering, than that possible from the use of an opacifying pigment alone. In U.S. Pat. No. 4,377,616, the film is prepared by melting a mixture of a major proportion of a film forming polymer such as polypropylene and a minor proportion of an incompatible polymer which has a higher melting point, at a temperature sufficient to melt the incompatible polymer and to dispense it in the film forming polymer, extruding the mixture into a film and biaxially orienting the film. The dispersed incompatible polymer provides sites for the formation of voids surrounding the polymer particles. These voids provide opacity and give the film an attractive pearlescent sheen.

Transparent, void-free thermoplastic skin layers are adhered to the surface of the core layer of the film of U.S. Pat. No. 4,377,616 to yield smooth film surfaces, free of the surface irregularities or surface projections of the core material. Without such skin layers being provided, U.S. Pat. No. 4,377,616, teaches that the lustrous appearance of the satin finish would be materially lessened. However, the use transparent, void-free thermoplastic skin layers to encapsulate the core layer can yield a film with somewhat undesirable end use characteristics. For example, when such films are utilized in certain label making operations, a skin layer surface may, through frictional contact, adhere to an excessive degree to the label processing equipment, resulting in labels of poor quality and/or equipment shut-down. Although the equipment can often be adjusted to minimize such problems, films which would provide a greater degree of operability would clearly be desirable. Another problem sometimes encountered in the end-use processing of the known opaque multilayer film structures employing transparent, void-free thermoplastic skin layers is that often such film structures are difficult to cut. Additionally, from an appearance standpoint, rather than provide a transparent skin layer, it is sometimes desirable to provide a skin layer of increased opacity.

Therefore, what is needed is a film structure of high opacity which provides improved cutting characteristics and an improved range of operability, while maintaining high strength and stiffness.

SUMMARY OF THE INVENTION

The film structure of the present invention is an opaque, biaxially oriented polymeric film. The film structure comprises a thermoplastic polymer matrix core layer having a first surface and a second surface within which is located a strata of voids, positioned at least substantially within a substantial number of these voids is at least one spherical void-initiating particle which is phase distinct and incompatible with the matrix material, the void space occupied by the particle being substantially less than the volume of the void, with one generally cross-sectional dimension of the particle at least approximating a corresponding cross-sectional dimension of the void, the population of the voids in the core layer being such as to cause a significant degree of opacity; and at least one thermoplastic polymer matrix skin layer adhering to at least the first surface of the core layer, within which is located a strata of voids; positioned within at least a substantial number of these voids is at least one void-initiating solid particle which is phase distinct and incompatible with the matrix material, the void space occupied by the particle being substantially less than the volume of the void, with one generally cross-sectional dimension of the particle at least approximating a corresponding cross-sectional dimension of the void.

A process for preparing an opaque, biaxially oriented polymeric film structure is also provided herein. The process of the present invention comprises the steps of mixing a major proportion of a first thermoplastic polymeric material with a minor proportion of a first material of higher melting point or having a higher glass transition temperature than the first thermoplastic polymeric material to produce a core layer mixture; heating the core layer mixture so produced to a temperature of at least above the melting point of the first thermoplastic polymeric material; dispersing the first material of higher melting point or higher glass transition temperature of the mixture so produced uniformly throughout the molten first thermoplastic polymeric material in the form of microspheres; mixing a second thermoplastic polymeric material with a second material of higher melting point than the second thermoplastic polymeric material to produce a void-containing skin layer mixture; heating the skin layer mixture so produced to a temperature of at least above the melting point of the second thermoplastic polymeric material; dispersing the second higher melting point material of the mixture so produced uniformly throughout the molten second thermoplastic polymeric material; forming a biaxially oriented coextruded film structure from the core layer mixture and the void-containing skin layer mixture the forming step conducted at a temperature and to a degree to form a strata of opacifying voids within both the core layer and the void-containing skin layer.

It is therefore an object of the present invention to provide a film structure of high opacity.

It is another object of the present invention to provide an opaque, biaxially oriented polymeric film which provides improved cutting characteristics.

It is a further object of the present invention to provide an opaque, biaxially oriented polymeric film which provides an improved range of operability when undergoing processing.

It is still another object of the present invention to provide an opaque, biaxially oriented polymeric film having a reduced coefficient of friction on at least one surface thereof.

It is still a further object of the present invention to provide an opaque, biaxially oriented polymeric film having excellent stiffness and strength characteristics.

It is yet another object of the present invention to provide a process for producing such an opaque, biaxially oriented polymeric film.

DETAILED DESCRIPTION OF THE INVENTION

In order to achieve the desired film strength, stiffness and opaque appearance of the multilayer film structure of the present invention, it is important that a particular thickness relationship exist between the thickness of the core layer, the thickness or thicknesses of the void-containing thermoplastic polymer matrix skin layer or layers adhered to one or both surfaces of the core layer, and the thickness of the optional void-free skin layer which can be transparent or pigmented for further opaqueness. It is preferred that the core layer thickness be from about 30% to about 95% of the overall thickness of the structure. This, in combination with the population and configuration of the voids in a structure of at least about 0.5 mils thick, will materially contribute to the overall degree of opacity of the structure. The population and configuration of the voids and the core thickness will be such as to cause a significant degree of opacity, for example, less than about 50% light transmission, with less than about 70% light transmission preferred. Similarly, by maintaining the skin thickness within a particular range in relation to the thickness of the core layer, the overall combination can result in an opaque lustrous appearance.

Other structures besides the three layer structure described above are within the scope of the present invention. For example, structures having more than three layers and having multiple void-containing layers would have particular utility in certain applications. Such a multiple void-containing layered film could employ different void-initiating agents of the types described hereinbelow in each of the void-containing layers and/or have each of its void-containing layers be voided to a different extent via processing, size of the void-initiating particles and/or number of particles employed. As can be appreciated, both the physical properties of the resultant multilayered film, as well as its visual appearance can be advantageously varied using the multiple void-containing layered film approach of the present invention.

To prepare the thermoplastic polymer matrix core layer of the multilayer structure of the present invention, it is preferred that the average diameter of the void-initiating particles used in that layer be from about 0.1 to about 10 microns. These particles should be generally spherical in shape so as to initiate a void of unusual regularity and orientation in a stratified relationship throughout the thermoplastic polymer matrix material after biaxial orientation of the structure. This does not mean that every void is the same size, as those skilled in the art will readily understand. Rather, what is meant is that generally speaking, each void tends to be of like shape even though it may vary in its dimensions from those of other voids because all of the voids are initiated by a spherical particle. Ideally, the voids assume a shape defined by two opposed and edge-contacting concave disks. Optimum characteristics of opacity and satin-like appearance are obtained when the two average major void dimensions are greater than about 30 microns. The void-initiating particle material for use in the thermoplastic polymer matrix core layer should be incompatible with the substrate material, at least at the temperature of biaxial orientation.

The core layer has been described above as being a thermoplastic polymer matrix material within which is located a strata of voids. From this it is to be understood that it is the voids that create the matrix configuration. The term "strata" is intended to convey the understanding that there are a large number of voids creating the matrix and the voids themselves are oriented so that the two major dimensions are aligned in correspondence with the direction of orientation of the polymeric film structure. After each void has been formed through the initiation of one or more spherical particles, it is possible that the particle or particles will contribute little else to the system. For example, when the refractive index of a void-initiating particle is close enough to that of the matrix material, it may make no additional contribution to opacity. When this is the case, the opacity is principally a function of the light scattering affect which occurs because of the existence of the voids of the system. The opacity of the system can be further enhanced by the inclusion therein of an opacifying pigment dispersed throughout. For example, a proportion of pigment in the core layer of from about 1% to about 3% by weight can enhance opacity. The pigment material can be present in such a particle size and shape that it does not, at least in any material sense, contribute any void initiation by itself. The optional presence of the opacifying pigment may contribute perhaps about 3% to 8% to the degree of opacity of the system.

A typical void of the core layer is defined as having major dimensions X and Y and a minor dimension Z, where dimension X is aligned with machine direction orientation, dimension Y is aligned with transverse direction orientation and dimension Z approximately corresponds to the cross-sectional dimension of the spherical particle which initiated the void.

It is a necessary part of the present invention that orientation conditions be such that the X and Y dimensions of the voids of the core layer be major dimensions in comparison to the Z dimension. Thus, while the Z dimension generally approximates the cross-sectional dimension of the spherical particle initiating the void, the X and Y dimensions, must be significantly greater. In addition, the orientation conditions must be such that the general integrity of the voids is maintained. By this, it is meant that during the orientation which produces the X and Y dimensions, that is, either by simultaneous or sequential machine direction and transverse direction stretching, the temperature conditions must be such as to permit these major dimensions to form without any destruction of the voids in any of its dimensions. The voids are particularly vulnerable to destruction during sequential orientation if the stretching forces will tend to cause internal shredding and void splitting. This leads to a complete loss of control over the integrity of the closed voids, and the consequent integrity of the polymer matrix. Thus, one skilled in the art, following the present general guidelines can orient at a temperature and to a degree which will yield X and Y dimensions approaching a maximum without causing at least any substantial splitting, shredding or overall lack of void and matrix integrity.

By way of illustration, room temperature biaxial orientation of a multilayer film having a core matrix layer of polypropylene film containing polybutylene terephthalate spheres of the size and amount contemplated herein will not produce the claimed structure. Either void splitting will occur or voids of insignificant size will result. Polypropylene must be oriented at a temperature which is significantly higher than its glass transition temperature. The temperature conditions must permit X and Y to be at least several multiples of the Z dimension without incurring any significant incidence of void splitting. If this is accomplished, optimum physical characteristics including low water vapor transmission rates and a high degree of light scattering will be obtained with little, if any, void splitting or film fibrillating.

As indicated above, the polymer constituting core layer and the void-initiating particle must be incompatible in the sense that the materials form two distinct phases. The spherical void-initiating particles constitute a dispersed phase throughout the lower melting core polymer which will, upon orientation become a void-filled matrix with the spherical particles contained somewhere within the voids.

As a result of the biaxial orientation of the film laminates described herein, in addition to rendering its core layer opaque, the orientation improves other physical properties of the multilayer structure such as flex-cracking resistance, Elmendorff tear strength, elongation, tensile strength, impact strength and cold strength properties. In addition to this, an unusual and highly attractive lustrous appearance is imparted to the film. This appearance is generally not seen in the absence of the skin layer or layers, or if the thickness of the skin layer or layers is not enough to conceal the surface imperfections produced within the core layer. The resulting film can also possess low water vapor transmission rate and low oxygen transmission rate characteristics which makes the film ideally suited for packaging food products, including liquids. The film also has attractive utility as a decorative wrap material, as those skilled in the art will readily appreciate. Generally, a greater number of voids will be closed, as a result of which there is essentially no opportunity for liquid and/or gas to penetrate the core layer.

The void-initiating particles can be organic or inorganic provided that they are approximately spherical in shape and within the preferred particle size range so as to initiate the formation of a void, which, in a significant number of cases, will take on a lens-like shape, that is, a lens of a biconvex shape. When a polymeric material is employed as the void-initiating particle, it can be a polymer which is co-melted with the polymer of the core layer. In such a case, it is necessary for the void-initiating polymer to have a sufficiently higher melting point than the core polymer to be incompatible therewith and to be capable of assuming a dispersed phase in the form of small spherical particles as the temperature of the co-melted mix is reduced. It is also contemplated that the void initiating particles can be preformed and then uniformly dispersed into a melt of core polymer, e.g., one of polypropylene. This has the advantage of avoiding subjecting the core polymer to the temperature of a much higher melting polymer thereby minimizing the risk of thermal degradation of the core polymeric material.

It is believed that, because of the number, shape and orientation strata-wise of the voids in the core layer, a significantly enhanced light scattering effect is obtained. This effect is further increased by the presence of a void-free transparent or pigmented skin layer coextensively applied to the core layer.

When preformed void-initiating particles are employed, in the core matrix layer, it is the shape and size of the particles that is important rather than their chemical nature. Thus, solid or hollow organic or inorganic particles of any type can be employed. Interesting effects can be produced by the use of spheres of different colors. Since, statistically, each void has approximately one particle somewhere within the void, interesting and aesthetically pleasing color and/or reflectance effects can be imparted to the overall layer structure by use of particles of different color absorption or reflectance. The light scattered in a particular void is additionally either absorbed or reflected by the void-initiating particle and a separate color contribution is made to the light scattered within each void.

The void-initiating particles can be based on any of a variety of thermoplastic resins such as polybutylene terephthalate, polyethylene terephthalate acetals, polyamides, acrylic resins, and the like, provided that they remain phase distinct and incompatible with the resin constituting the remainder of the core layer. Polybutylene terephthalate (PBT), also known as polytetramethylene terephthalate (PTMT), is an especially preferred void-initiating material for use herein. This material is a highly crystalline polymer obtained from the polycondensation of dimethyl terephthalate with 1,4-butanediol. PBT possesses good mechanical, chemical and electrical properties. It has good flowability and a rapid crystallization rate. It has a melting point of 440° F. and a glass transition temperature of approximately 104° F. It has good thermosetability and relatively high UL temperature indices. This material has good tensile strength, toughness and dimensional stability, low water absorption and low static and dynamic coefficients of friction. Typical processing conditions for PBT involve melts at 450°–500° F.

Inorganic materials which are useful as void-initiating particles for the core matrix layer include solid or hollow preformed glass spheres, metal beads or spheres, ceramic spheres, and the like. In fact any material which is inherently spherical, or can be formed into a sphere without causing thermal degradation to the core polymer, is entirely suitable herein.

The incorporation of voids in the core layer of the films of the instant invention permits a reduction in light transmission therethrough to as low as about 16% and even lower. This would be the case for a film having an overall thickness of at least 1.5 mils when the core portion is at least 60% and the thickness of the skin layer or layers makes up the remaining 40% thickness.

While the preferred particle size of the void-initiating particles is generally on the order of from about 0.1 to about 10 microns, it is particularly preferred that the particle size range from about 0.75 to about 2 microns. The void-initiating particles can be present in up to about 20% by weight of the core layer prior to orientation, a preferred range being from about 2 to about 7 percent by weight.

The use of a void-free polymeric skin layer adhered to a surface of the above-described core layer, wherein the skin layer thickness is such that the outer surface of the skin layer does not manifest the surface irregularities of the core layer, is known. The use of such a skin layer produces a film structure having a highly desirable appearance, and produces enhanced film processing characteristics over a single-layer film merely consisting of the core layer, alone. This is due to the tendency of the void-initiating particles to become dislodged from the matrix structure and affix themselves to the processing equipment, in essence "gumming-up" such equipment. The encapsulation of the core layer by skin layers can prevent this from occurring.

While the use of such void-free polymeric skin layers can improve the further processing of such films, in some instances these films also exhibit processing limitations often related to the inherently high coefficient of friction of such films. It has now been discovered that, by incorporating voids into at least one of the skin layers through the use of inorganic void-initiating particles, the coefficient of friction of the surface of that skin layer can be significantly reduced, thus extending the range of operability of such a film in film processing equipment. Moreover, by employing the void-initiating particles of the type preferred for use in the practice of the present invention, the problems associated with dislodged particles, described above, is avoided. Although this benefit may suggest the use of certain preferred inorganic void-initiating particles in a non-encapsulated, single layer structure, to achieve the same level of opaqueness as is obtained using the organic void-initiating particles preferred for use in the core layer, higher concentrations of inorganic material are required. These higher concentrations would serve to sacrifice many of the desirable attributes inherent in the polymeric matrix material, itself, such as strength, stiffness, etc.

Another advantage which accrues from the use of at least one void-containing skin layer in the multilayer film structures of the present invention relates to an improvement in film cutting. Surprisingly, films produced according to the present invention have been found to cut in a more paper-like manner, which is advantageous when such films are used in the production of label stock for use in various packaging applications, such as bottle labels, for example. The use of a void-containing skin layer on the side of the film where the final cut takes place creates a weaker region of film in this critical area, while retaining overall film integrity. This weaker region of film is responsible for the more paper-like cutting characteristics of the films produced in accordance with the present invention. Such paper-like cutting characteristics have been found to particularly benefit the production of coextruded pressure sensitive label stock material having a peelable backing affixed thereto.

Void-initiating particles preferred for use in at least one of the skin layers of the multilayer structure of the present invention include both inorganic and organic materials. When an organic material is employed as a void-initiating particle, it is important that the material be one which does not exhibit the tendency of becoming easily dislodged from the matrix structure, as discussed above. Preferred inorganic materials include crushed calcium carbonate, magnesium carbonate, magnesium silicate, aluminum silicate, silica and alumina, with calcium carbonate being particularly preferred. As was the case for the void-initiating particles preferred for use in the core layer, the preferred particle size of the void-initiating particles is generally on the order of from about 0.1 to about 10 microns, while it is particularly preferred that the particle size range from about 1 to about 5 microns. The void-initiating particles can be present in an amount of up to about 70% by weight of the skin layer prior to orientation, a preferred range being from about 5 to about 20 percent by weight. Compared to the particles preferred for use in the core layer, these particles, and particularly the inorganic particles, generally have a random shape, rather than a spherical shape, the shape of the particles used in the skin layer not being critical to the appearance of the resulting multilayer structure. Consistent with the void-initiating particles used in the core layer, those particles selected for use in at least one of the skin layers must be incompatible with the polymeric matrix skin layer material.

Polymers preferred for use in the practice of the present invention are isotactic propylene homopolymers, random and sequential copolymers of propylene and ethylene, and other copolymers composed primarily of propylene units. Such polymeric materials will generally exhibit melting points of at least about 285° F., preferably of at least about 300° F. Melt indices in the range of 0.5 g/10 minutes to about 8 g/10 minutes at 446° F. are preferred.

Additives such as fillers, antioxidants, pigments antistatic agents, slip agents, antitack agents and the like, can be incorporated in the usual amounts in one or more of the layers constituting the multilayer film.

As disclosed in U.S. Pat. No. 4,701,370, the contents of which are incorporated by reference in their entirety, the addition of a relatively minor amount of particles of titanium dioxide-coated mica to the polymeric material constituting the skin layer or layers provides a marked increase in the stiffness of the multilayer film. An effective amount of titanium dioxide-coated mica for use in the practice of the present invention would range from 0.1 to about 10 weight percent of the skin layer material. A suitable titanium dioxide-coated mica is the Eagle Mica M series marketed by Eagle Quality Products Co., of Uwchland, Pa.

It is preferred to coextrude the core layer and the skin layer or layers in producing the multilayer film of this invention. Thereafter, the film, whether produced by coextrusion or by some other technique is subjected to biaxial stretching, or orientation, to an extent and at a temperature calculated to provide the maximum degree of opacity without any significant impairment in the physical characteristics, including the appearance of the film. Obviously, as the materials employed in the construction of the film differ, the conditions of biaxial orientation will be modified to reflect such differences. By way of exemplification, when employing a stereoregular polypropylene as the core polymer and when employing PBT as the void-initiating material, a machine direction orientation of from about 4 to about 8 times and a transverse direction orientation of from about 4 to about 8 times, at a drawing temperature of from about 212° F. to about 320° F. can be used to provide an opaque, biaxially oriented film of from about 0.5 to about 2 mils in overall thickness.

When producing coextruded pressure sensitive label stock material with peelable backing, it is advantageous from the standpoint of label cutting to position the void-containing skin layer against the peelable backing material. The pressure sensitive adhesive can be applied to the surface of the void-containing skin layer in a continuous or discontinuous manner as dictated by the requirements of the particular application. The adhesive can be applied using any of a number of well-known techniques for accomplishing such tasks, including the technique of "printing" the adhesive upon the exposed surface of the void-containing skin layer.

The pressure sensitive adhesive component can be selected from amongst any of the materials which are known to be useful for this purpose. In general, non-solvent pressure sensitive adhesive materials are preferred to solvent-based pressure sensitive adhesive materials. Acceptable materials include: natural and/or synthetic rubbers, butadiene-styrene rubbers, polyisobutylene rubbers, polyisobutadiene rubbers, ethylene-propylene terpolymer rubbers, polyacrylic rubbers, polyvinyl ether rubbers, butadiene-acrylonitile rubbers, butadiene-styrene-acrylonitile rubbers, butyl rubbers, and the like, in combination with a tacky or tackifying resin, such as a rosin ester, a hydrogenated rosin ester, the glycerol ester of hydrogenated rosin, a polyterpene resin, a crude rubber, a polyisobutylene or other unsaturated hydrocarbon resin, a phenolated terpene, a petroleum resin, and the like. The pressure sensitive adhesive may also contain additives such as antioxidants, fillers and the like.

The polymeric release layer employs a release agent applied to the film surface to which it will subsequently be affixed to the pressure sensitive adhesive side of the multilayer opaque oriented film structure. The release agent can be selected from any of the materials known to have been used for their release properties for pressure sensitive adhesives. Common types are silicones and modified silicons, the modification including both copolymerization, or silicones with other non-release chemical agents, or by adding non-silicone materials to a silicone coating prior to surface application of the release agent to the release layer. Other release agents such as polyethylene, fluorocarbon, the Werner-type chromium complexes and polyvinylidene octadecyl carbamate have also been used. The choice of a release coating is dependent on the tack and adhesion level of the adhesive contained in the adjacent layer as may be appreciated by those skilled in the art. Any of the well-known techniques for applying release agents may be employed herein.

If desired, the exposed surface of one of the skin layers can be treated in a known and conventional manner, such as by flame or corona discharge to achieve the expected benefits obtained by such surface treatments, such as improved ink receptivity.

The following specific examples are presented herein to illustrate particular embodiments of the present invention and hence are illustrative of this invention and not to be construed in a limiting sense.

EXAMPLE 1

A mixture of 94 percent, by weight, isotactic polypropylene (MP=320° F., melt index=4.5), containing 6 weight percent PBT (MP=440° F.) as the core layer void-initiating material, is melted in an extruder with a screw of L/D ratio of 20/1 to provide the core layer mixture. A second extruder, in association with the first extruder, is supplied with the same isotactic polypropylene as the first extruder but containing titanium dioxide particles at 4 percent, by weight, and talc (Cyprus Mistron ZSC) at 2 percent, by weight. The talc serves as an antiblocking agent, while the titanium dioxide particles are employed as a whitener for this skin layer mixture. A third extruder, in association with the first two extruders, is supplied with the same isotactic polypropylene as the first two extruders but containing 15 percent, by weight, of calcium carbonate in crushed, random particle form, to serve as void-initiating particles for this skin layer mixture. A melt coextrusion is carried out while maintaining the cylinder of the core polymer material at a temperature sufficient to melt the polymer mixture, i.e., from about 450° F. to about 550° F. or higher. The polypropylene mixtures to be extruded as skin layers are maintained at about the same temperature as the polypropylene used in fabricating the core layer. A multilayer film laminate is coextruded with a core thickness representing about 70 percent of the overall extruded thickness, with the thicknesses of the skin layers representing the balance of the film thickness. The unoriented film measured about 40 mils in thickness. The resultant film sheet was subsequently oriented eight by five and one-half times using a commercially available sequential biaxially orienting apparatus to provide a multilayer film structure. The machine direction (MD) orientation is conducted at about 285° F. and the transverse direction (TD) orientation is conducted at about 300° F. The resultant 1.5 mil multilayer film exhibits a relatively rough surface finish of high opacity when viewed from its void-containing skin layer side and a smooth lustrous appearance when viewed from its non-void containing skin layer side.

The film so produced was compared to a film laminate produced in accordance with U.S. Pat. No. 4,560,614, the contents of which are incorporated by reference in their entirety. The film produced in Example 1 exhibited a wider range of operability in a beverage container label making apparatus than the film produced in accordance with U.S. Pat. No. 4,560,614. This was believed to result from the reduced coefficient of friction of the void-containing skin layer surface. Moreover, from an appearance standpoint, the film produced in Example 1 exhibited enhanced opacity as a result of the void-containing skin layer utilized.

EXAMPLE 2

This example pertains to the production of pressure sensitive label stock. Once again, a mixture of 94 weight percent isotactic polypropylene (MP=320° F., melt index=4.5), containing 6 weight percent PBT (MP=440° F.) as the core layer void-initiating material, is melted in an extruder with a screw of L/D ratio of 20/1to provide the core layer mixture. A second extruder, in association with the first extruder is supplied with the same isotactic polypropylene as the first extruder and titanium dioxide particles at 4 percent, by weight, and talc (Cyprus Mistron ZSC) at 2 percent, by weight. A third extruder in association with the first two extruders, is supplied with the same isotactic polypropylene as the first two extruders and 15 percent, by weight, of crushed calcium carbonate, to serve as void-initiating particles for this layer. A melt coextrusion is carried out while maintaining the cylinder of the core polymer material at a temperature sufficient to melt the polymer mixture, i.e., from about 450° F. to about 550° F., or higher. As before, the polypropylene mixtures coextruded as skin layers are maintained at about the same temperature as the polypropylene used in fabricating the core layer. A multilayer film laminate is coextruded with a core thickness representing about 70 percent of the overall extruded thickness, with the thicknesses of the skin layers representing the balance of the film thickness. The unoriented film measured about 40 mils in thickness. The resultant film is biaxially oriented as in Example 1. A 2:1 weight-part mixture of a hydrogenated rosin derivative and styrene-butadiene rubber pressure-sensitive adhesive is printed onto the void-containing skin layer surface. A release layer, also employing the same polypropylene as used in the multilayer coextruded film structure, is separately extruded. A commercially obtained silicone release agent is applied to one surface of the release layer. The multilayer opaque film is adhered to the separately extruded, transparent release layer.

The pressure sensitive label stock so produced was run through a die-cutting apparatus to produce label stock having separately detachable labels affixed to a continuous release layer. When compared to label stock produced in accordance with with U.S. Pat. No. 4,582,736, the contents of which are incorporated by reference in their entirety, the film produced in accordance with the present invention exhibited improved cutting characteristics over the pressure sensitive label stock produced in accordance with U.S. Pat. No. 4,582,736. This was believed to result from the void-containing layer surface. Moreover, from an appearance standpoint, the film produced in Example 2 exhibited enhanced opacity as a result of the void-containing skin layer utilized.

Although the present invention has been described with preferred embodiments, it is to be understood that modifications and variations may be resorted to without departing from the spirit and scope of this invention. Such variations and modifications are considered to be within the purview and scope of the appended claims.

What is claimed is:

1. An opaque, biaxially oriented polymeric film structure comprising:
   (a) a thermoplastic polymer matrix core layer having a first surface and a second surface, within which is located a strata of voids; positioned at least substantially within a substantial number of said voids is at least one spherical void-initiating particle which is phase distinct and incompatible with said matrix material, the void space occupied by said particle being substantially less than the volume of said void, with one generally cross-sectional dimension of said particle at least approximating a corresponding cross-sectional dimension of said void; the population of said voids in said core being such as to cause a significant degree of opacity; and
   (b) at least one thermoplastic polymer matrix skin layer adhering to at least said first surface of said core layer, within which is located a strata of voids; positioned within at least a substantial number of said voids is at least one void-initiating solid particle which is phase distinct and incompatible with said matrix material, the void space occupied by said particle being substantially less than the volume of said void, with one generally cross-sectional dimension of said particle at least approximating a corresponding cross-sectional dimension of said void.

2. The film structure of claim 1, further comprising a void-free, thermoplastic skin layer adhering to said second surface of said core layer, said void-free skin lyer being of a thickness such that the outer second surface of said matrix core layer does not, at least substantially, manifest the surface irregularities of said matrix core layer.

3. The film structure of claim 2, wherein said void-free skin layer contains an opacifying or coloring agent.

4. The film structure of claim 2, wherein said void-free skin layer contains an antiblocking agent.

5. The film structure of claim 1, wherein said void-containing thermoplastic polymer matrix skin layer is also adhered to said second surface of said core layer.

6. The film structure of claim 1, wherein said core layer is fabricated from isotactic polypropylene.

7. The film structure of claim 6, wherein said skin layer is fabricated from isotactic polypropylene.

8. The film structure of claim 1, wherein the void-initiating particles of said core layer comprise polybutylene terephthalate.

9. The film structure of claim 1, wherein the void-initiating particles of said skin layer comprise calcium carbonate.

10. The film structure of claim 1, further comprising a second thermoplastic polymer matrix skin layer adhering to said second surface of said core layer, within which is located a strata of voids; positioned within at least a substantial number of said voids is at least one void-initiating solid particle which is phase distinct and incompatible with said matrix material, the void space occupied by said particle being substantially less than the volume of said void, with one generally cross-sectional dimension of said particle at least approximating a corresponding cross-sectional dimension of said void, wherein said second thermoplastic polymer matrix skin layer is voided to an extent which differs from said thermoplastic polymer matrix skin layer of element (b) as indicated by relative opacity.

11. The film structure of claim 1, further comprising a second thermoplastic polymer matrix skin layer adhering to said second surface of said core layer, within which is located a strata of voids; positioned within at least a substantial number of said voids is at least one void-initiating solid particle which is phase distinct and incompatible with said matrix material, the void space occupied by said particle being substantially less than the volume of said void, with one generally cross-sectional dimension of said particle at least approximating a corresponding cross-sectional dimension of said void, wherein said void-initiating solid particle of said second thermoplastic polymer matrix skin layer is a material which differs from said void-initiating solid particle of said thermoplastic polymer matrix skin layer of element (b).

12. A process for preparing an opaque, biaxially oriented polymeric film structure, comprising the steps of:
   (a) mixing a major proportion of a first thermoplastic polymeric material with a minor proportion of a first material of higher melting point or having a higher glass transition temperature than the first thermoplastic polymeric material to produce a core layer mixture;

(b) heating the core layer mixture produced in step (a) to a temperature of at least above the melting point of the first thermoplastic polymeric material;

(c) dispersing the first material of higher melting point or higher glass transition temperature of the mixture produced in step (a) uniformly throughout the molten first thermoplastic polymeric material in the form of microspheres;

(d) mixing a second thermoplastic polymeric material with a second material of higher melting point than the second thermoplastic polymeric material to produce a void-containing skin layer mixture;

(e) heating the skin layer mixture produced in step (d) to a temperature of at least above the melting point of the second thermoplastic polymeric material;

(f) dispersing the second material of higher melting point of the mixture produced in step (d) uniformly throughout the molten second thermoplastic polymeric material;

(g) forming a biaxially oriented coextruded film structure from the core layer mixture and the void-containing skin layer mixture, said forming step conducted at a temperature and to a degree to form a strata of opacifying voids within both the core layer and the void-containing skin layer.

13. The process of claim 12, further comprising the step of adhering a void-free, thermoplastic skin layer to a core layer surface, the void-free skin layer being of a thickness such that the outer surface of the matrix core layer does not, at least substantially, manifest surface irregularities of the matrix core layer.

14. The process of claim 13, wherein said void-free skin layer contains an opacifying or coloring agent.

15. The film structure of claim 13, wherein said void-free skin layer contains an antiblocking agent.

16. The process of claim 12, wherein a second void-containing thermoplastic polymer matrix skin layer is adhered to the other surface of the core layer.

17. The process of claim 12, wherein the core layer is fabricated from isotactic polypropylene.

18. The process of claim 17, wherein each of the skin layers is fabricated from isotactic polypropylene.

19. The process of claim 18, wherein the first material of higher melting point or higher glass transition temperature of the core layer mixture comprises polybutylene terephthalate.

20. The process of claim 19, wherein the second material of higher melting point of the skin layer mixture comprises calcium carbonate.

* * * * *

UNITED STATES PATENT AND TRADEMARK OFFICE
CERTIFICATE OF CORRECTION

PATENT NO. : 4,965,123

DATED : October 23, 1990

INVENTOR(S) : Lawrence Swan et al

It is certified that error appears in the above-identified patent and that said Letters Patent is hereby corrected as shown below:

Col. 12, line 13, Claim 2      Delete "lyer" and insert --layer--.

Signed and Sealed this

Nineteenth Day of May, 1992

*Attest:*

DOUGLAS B. COMER

*Attesting Officer*      *Acting Commissioner of Patents and Trademarks*